United States Patent Office 3,236,787
Patented Feb. 22, 1966

3,236,787
CELLULAR POLYURETHANE PREPARED FROM A PHOSPHORUS CONTAINING POLYESTER
Heinz Jonas, Leverkusen, Peter Hoppe, Troisdorf, and Engelbert Walaschewski, Cologne-Bayenthal, Germany, assignors to Farbenfabriken Bayer Aktiengesellschaft, Leverkusen, Germany, a German corporation
No Drawing. Filed Apr. 11, 1961, Ser. No. 102,115
Claims priority, application Germany, Apr. 12, 1960, F 30,981
2 Claims. (Cl. 260—2.5)

This invention relates to polyesters and, more particularly, to polyesters which may be either saturated or unsaturated and which are particularly adapted for the production of flame resistant plastics, especially polyurethane plastics.

It is well known to employ monomeric phosphorus compounds in the preparation of plastics for the purpose of imparting flame resistant properties thereto. Trichloroethyl phosphite is an example of a monomeric phosphrus compound which has proven particularly effective. These compounds, however, tend to exude from the plastic during storage under conditions where the monomer is incompatible with the polymeric substance such as under pressure or at elevated temperatures so that the flame retarding effect of the trichloroethyl phosphite is lost.

Another method of producing flame retardant plastics heretofore been incorporated into polyesters by a chemical bonds so that it will not be released from the plastic under certain temperature or pressure conditions. For example, tetrachlorophthalic acid or phosphoric acid have heretofore been incorporated into polyesters by a chemical combination thereof with polycarboxylic acids and polyhydric alcohols. Plastics made from these polyesters are then a chemically homogeneous substance as opposed to a heterogeneous mixture. However, these heretofore known chemical combinations of flame retarding agents and polyester ingredients lead to products which have unsatisfactory physical properties and more particularly are undesirably brittle and have application only to restricted fields where their brittleness is not a disadvantage.

It is, therefore, an object of this invention to provide hydroxyl polyesters and plastics based on saturated hydroxyl polyesters which are substantially devoid of the foregoing disadvantages. It is a particular object of this invention to provide hydroxyl polyesters and a method for the preparation thereof which will impart a high degree of flame resistance to plastics without substantially harming the other physical properties thereof. Another object of this invention is to provide a method of making flame resistant polyurethane plastics. Still a further object of this invention is to provide a method of making flame resistant plastics by polymerization of polyesters with polymerizable substances through unsaturated copolymerization reactions. Still a further object of this invention is to provide cellular polyurethane plastics suitable for use as insulation and the like which have particularly good flame retarding properties. A further object of the invention is to provide coating compositions which have flame resistant properties.

The foregoing objects and others which will become apparent from the following description are accomplished in accordance with the invention, generally speaking, by providing polyesters prepared from alcohols, carboxylic acids and dialkyl phosphites. The polyesters of the invention may be hydroxyl terminated, they may be saturated or they may be unsaturated depending on the final plastic which is to be prepared therefrom. If the polyester is intended to be used in the preparation of polyurethane plastics, then it should preferably be hydroxyl terminated and prepared from a polycarboxylic acid and a polyhydric alcohol in addition to the dialkyl phosphite. If the polyester is to be used for the preparation of copolymers, for example, with ethylenically unsaturated compounds, then either an unsaturatde polycarboxylic acid, polyhydric alcohol or both should be used for the preparation of the polyester and in this event the polyester may or may not contain terminal hydroxyl groups. It is preferred to prepare hydroxyl polyesters which are used for the preparation of polyurethane plastics and indeed it is the polyesters which are specially adapted for the preparation of polyurethane plastics which find the greatest utility and which serve to best advantage to produce plastics having unharmed physical properties.

Any suitable dialkyl phosphite may be used but those having the formula

wherein R is a lower alkyl radical preferably having from 1 to 5 carbon atoms give the best results. Specific compounds are dimethyl phosphite, diethyl phosphite, dipropyl phosphite, dibutyl phosphite, dipentyl phosphite, methyl ethyl phosphite, ethyl butyl phosphite and the like.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, o-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene gylcol, 1,4-butylene glycol, 1,3-butylene glycol, 1,2-butylene glycol, butene-1,4-diol, 1,5-pentane diol, 1,4-pentane diol, 1,3-pentane diol, 1,6-hexane diol, hexene-1,6-diol, 1,7-heptane diol, diethylene glycol, glycerine, trimethylol propane, 1,3,6-hexanetriol, triethanolamine, pentaerythritol, sorbitol and the like. In addition to the polycarboxylic acids and polyhydric alcohols, especially where the polyesters are made from ethylenically unsaturated components so that they may be further polymerized, monocarboxylic acids and/or monohydric alcohols may also be used such as lauric acid, stearic acid, benzoic acid and the like and/or butanol, pentanol and the like.

In addition one may also use the corresponding acid chlorides, acid anhydrides, epoxides or lower alkyl esters of the acids or alcohols set forth above providing they are capable of forming an ester.

The preparation of the phosphorus containing polyesters may be carried out in a straightforward and convenient manner by combining the polyhydric alcohol, polycarboxylic acid and dialkyl phosphite or the polyester may be prepared in a first step employing such proportions of polyhydric alcohol and polycarboxylic acid so that the polyester has terminal hydroxyl groups and then reacting the resulting hydroxyl terminated polyester with a dialkyl phosphite to prepare the polyesters of the invention. The phosphite is preferably used in such a quantity that the final polyester contains from about 0.1 percent to about 5 percent by weight of phosphorus. More than about 5 percent by weight of phosphorus may be used but it is preferred to use less than this amount since the advantageous physical properties of the plastics prepared from the polyesters fall off with increased amounts of phosphorus. Even amounts of phosphorus less than 2 percent by weight impart significant flame resistant properties to the plastics prepared from these polyesters and particularly the polyurethane plastics. The reaction takes place between the hydroxyl groups of the polyester or polyhydric alcohol and the alkoxy group of the dialkyl phosphite yielding 1 or 2 mols of monohydric alcohol for each mol of dialkyl phosphite which reacts. In other words, when dimethyl phosphite is used, methanol is split off and starts to distill at temperatures of about 110° C. to 150° C. Generally speaking, it is preferred to carry out the reaction at temperatures between about 100° C. and about 200° C. so that the reaction may be carried out in a reasonable length of time while simultaneously distilling off the alcohol formed. Best results are obtained by removing the last traces of the alcohol by finally heating the reaction mixture to an elevated temperature above 100° C. under a partial vacuum.

A significant advantage of the process of the invention is that transesterification catalysts such as phosphoric acid or alkalies are not required for the process and indeed when they have been tried, produce only an insignificant improvement in the yield and an insignificant shortening of the reaction time which is certainly not worth the effort necessary to remove these impurities from the final product. The preferred process is carried out without a catalyst.

Polyurethane plastics may be prepared from the polyesters as pointed out above including, for example, cellular or noncellular polyurethane plastics. The polyesters for the preparation of polyurethane plastics should preferably have a molecular weight between about 500 and about 10,000 with corresponding hydroxyl numbers and acid numbers for difunctional or higher polyfunctional, preferably polyhydroxyl, polyesters. Best results are obtained where the polyester has an hydroxyl number of from about 25 to about 300 with acid numbers below 5. The most preferred molecular weight range is from 1000 to 5000 with hydroxyl numbers ranging from 40 to 150 and acid numbers of 0 to 5.

Any suitable organic polyisocyanate may be used in the process of the present invention for the preparation of polyurethane plastics including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4' - biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

The preparation of cellular polyurethane plastics is an area where the invention finds its greatest advantage and for this purpose an organic polyisocyanate is reacted with a polyester prepared in accordance with the process of the invention which has a plurality of free hydroxyl groups in the presence of a blowing agent. A particularly desirable organic polyisocyanate is unrefined diphenylmethane diisocyanate obtained from the direct phosgenation of diamino diphenylmethane without separation of the crude polymeric by-products.

For the preparation of the cellular polyurethane plastics it is preferred to carry out the reaction in the presence of a catalyst including for example, tertiary amines, such as triethylene diamine, N-ethyl morpholine, N-methyl morpholine, diethyl ethanolamine, N-coco morpholine, 1-methyl-4-dimethyl amino ethyl piperazine, 3-methoxy N-dimethyl propyl amine, N-dimethyl-N'-methyl isopropyl propylene diamine, N,N-diethyl-3-diethyl amino propyl amine, dimethyl benzyl amine and the like or a suitable metal catalyst such as those disclosed in U.S. Patent 2,846,408 and particularly iron acetyl acetonate or tin salts of carboxylic acids such as, for example, dibutyl tin di-2-ethyl hexoate, dibutyl tin dilaurate or metal alcoholates such as, for example, stannous octoate, stannous oleate and the like. It is also preferred to use a foam stabilizer in the preparation of the cellular polyurethane plastics together with emulsifiers, coloring agents, fillers and the like if they are desired. A particularly suitable emulsifier is, for example, sulphonated castor oil, and a particularly suitable stabilizer is a silicone oil such as polydimethyl siloxane and the like. Suitable coloring agents are, for example, carbon black and suitable fillers are vermiculite, sawdust and the like. Due to their flame resisting properties the cellular polyurethane plastics of the invention are particularly useful in the preparation of insulation and may act as a substance with which to laminate two wall panels together and to produce a substantially rigid structure. For this purpose considerable aromaticity should be built into the polyester and/or organic polyisocyanate and preferably if a substantially rigid cellular plastic is to result, the polyester should have a functionality of at least three. In other words, it should contain at least three free hydroxyl groups per molecule. Of course, polyesters having free carboxyl groups may also be used for the preparation of the cellular polyurethane plastics since the carboxyl group reacts with an isocyanato radical to produce carbon dioxide which is only beneficial in the production of the foam structure.

Suitable blowing agents for the production of the cellular polyurethane plastics include water and the halohydrocarbons such as dichlorodifluoromethane, trichlorofluoromethane and the like.

In accordance with another embodiment of the invention coating compositions may be produced by reacting an organic polyisocyanate such as those disclosed above with the hydroxyl polyesters of the invention in an inert organic solvent therefor such as, for example, toluene, xylene, ethylene glycol monoethyl ether acetate and the like.

Polyurethane castings having flame resistant properties may be prepared by reacting an excess of the organic polyisocyanate with the hydroxyl polyester under substantially anhydrous conditions in a first step and then reacting the resulting isocyanato terminated prepolymer in a second step with an organic chain extending agent such as, for example, a polyhydric alcohol or polyamine having a molecular weight below about 500 and including for example, ethylene diamine, propylene diamine, 4,4'-diamino diphenyl-methane, 4,4'-dihydroxy diphenyl dimethyl methane, 1,4-butane diol, 1,6-hexane diol and the like.

The polyesters of the invention may be used for the preparation of copolymers by reaction with ethylenically unsaturated compounds provided that they contain some unsaturation. Suitable copolymerizable ethylenically unsaturated compounds include monomeric compounds, for example, styrene, methyl methacrylate, diallyl phthalate, tetrachlorophthalic acid diallyl ester and the like.

The plastics of the invention are useful for the preparation of either sound or thermal insulation, for the preparation of castings and moldings including gear wheels and the like and for the coating of various substrates, such as, for example, wood, metal such as steel and the like.

The invention is further illustrated by the following examples in which the parts are by weight unless otherwise indicated.

EXAMPLE 1

Production of the starting material

About 1000 parts of a polyester prepared by condensing about 2 mols of adipic acid, about 0.5 mol of phthalic anhydride, about 2.4 mols of trimethylol propane and about 0.8 mol of 1,4-butane diol with about 10 percent of free hydroxyl groups are mixed with about 116 parts of dimethyl phosphite and heated to about 120° C. When the temperature reaches about 145° C., about 60 percent of the total methanol contained therein has been distilled off. The remainder of the methanol is removed from the mixture, together with a small quantity of dimethyl phosphite, at about 145° C. to about 160° C./20 mm. Hg. The final product contains about 7 percent of free hydroxyl groups; about 30 percent of the hydroxyl groups originally present in the polyester are reacted with the dimethyl phosphite.

About 100 parts of the polyester obtained in this way are mixed with about 10 parts of aluminum silicate, about 3 parts of about a 50 percent aqueous solution of sodium-castor oil sulphate, about 2 parts of bis-(diethylamino-ethanol)-adipate and about 61.6 parts of 80 percent 2,4- and 20 percent 2,6-toluylene diisocyanate. The reaction mixture starts to foam immediately and hardens into a fine-pored, difficultly inflammable foam plastic with density of about 54 kg./m.³.

EXAMPLE 2

Production of the starting material

About 39.5 parts of a polyester of adipic acid, phthalic acid anhydride and 1,2,6-hexane triol (about 7.8 percent free hydroxyl groups) are heated with about 3.5 parts of dimethyl phosphite for about 90 minutes to about 150° C. From about 140° C., about 35 percent of the theoretically expected quantity of methanol distill off. By partial evacuation, a total quantity of about 1.7 parts of methanol are obtained, this quantity being about 100 percent of the theoretical. The resulting polyester which is obtained and in which about 30 percent of the initially present free hydroxyl groups are reacted with dimethyl phosphite, contains about 5.45 percent of free hydroxyl groups.

About 100 parts of this polyester are mixed with about 2 parts of N,N-dimethyl benzylamine, about 4 parts of about a 50 percent aqueous solution of sodium-castor oil sulphate and about 100 parts of diphenylmethane-4,4'-diisocyanate. The reaction mixture immediately starts to foam and solidifies into a non-shrinking and difficulty inflammable foam plastic.

EXAMPLE 3

Production of the starting material

About 500 parts of a polyester of adipic acid, 1,2,6-hexane triol and 1,4-butane diol (about 6.4 percent of free hydroxyl groups) are reacted as in Example 2 with about 30 parts of dimethyl phosphite. About 15 parts (about 85 percent of the theoretical) of methanol are obtained. The resulting polyester comprises about 4.8 percent of free hydroxyl groups.

About 20 parts of this polyester are mixed with about 80 parts of the polyester from Example 2 and with about 2 parts of permethylated amino ethyl piperazine, about 4 parts of about a 50 percent aqueous solution of sodium-castor oil sulphate and about 2 parts of diphenyl-methane-4,4'-diisocyanate. After the reaction mixture has foamed and solidified, an incombustible, fine-pored foam plastic with a density of about 42 kg./m.³ is obtained.

It is to be understood that the foregoing working examples are for the purpose of illustration and that any other suitable polycarboxylic acid, polyhydric alcohol, dialkyl phosphite, organic polyisocyanate, catalyst, stabilizer or the like could have been used therein with satisfactory results provided that the teachings of the disclosure were followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A cellular polyurethane plastic prepared by a process which comprises reacting, in the presence of a blowing agent, an organic polyisocyanate with an hydroxyl polyester prepared by a process which comprises reacting a polycarboxylic acid, a polyhydric alcohol having 2 to 6 free hydroxyl groups and a dialkyl phosphite having the formula

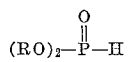

wherein R is a lower alkyl radical having 1 to 5 carbon atoms.

2. The cellular polyurethane plastic of claim 1 wherein said polyhydric alcohol is a mixture of a dihydric alcohol and a trihydric alcohol and said polycarboxylic acid is adipic acid.

References Cited by the Examiner

UNITED STATES PATENTS

| | | | |
|---|---|---|---|
| 2,437,046 | 3/1948 | Rothrock et al. | 260—75 |
| 2,764,565 | 9/1956 | Hoppe et al. | 260—2.5 |
| 2,824,085 | 2/1958 | Cummings | 260—75 |
| 2,913,436 | 11/1959 | Reeves et al. | 260—75 |
| 2,926,145 | 2/1960 | McConnell et al. | 260—2 |
| 2,950,262 | 8/1960 | Bush et al. | 260—2.5 |

FOREIGN PATENTS 221,411  5/1959  Australia.

LEON J. BERCOVITZ, *Primary Examiner.*

DANIEL ARNOLD, *Examiner.*